US009734507B2

(12) United States Patent
Amidon et al.

(10) Patent No.: US 9,734,507 B2
(45) Date of Patent: Aug. 15, 2017

(54) METHOD AND SYSTEM FOR SIMULATING RECOMMENDATIONS IN A SOCIAL NETWORK FOR AN OFFLINE USER

(75) Inventors: Christopher M. Amidon, Apex, NC (US); Richard J. Walsh, Raleigh, NC (US)

(73) Assignee: Napo Enterprise, LLC, Wilmington, DE (US)

( * ) Notice: Subject to any disclaimer, the term of this patent is extended or adjusted under 35 U.S.C. 154(b) by 2194 days.

(21) Appl. No.: 11/961,730

(22) Filed: Dec. 20, 2007

(65) Prior Publication Data
US 2009/0164199 A1    Jun. 25, 2009

(51) Int. Cl.
| | |
|---|---|
| G06Q 30/02 | (2012.01) |
| G06Q 10/10 | (2012.01) |
| H04N 7/173 | (2011.01) |
| H04N 21/258 | (2011.01) |
| H04N 21/266 | (2011.01) |
| H04N 21/466 | (2011.01) |
| H04N 21/4788 | (2011.01) |
| H04N 21/654 | (2011.01) |
| H04N 21/658 | (2011.01) |
| H04L 29/08 | (2006.01) |

(52) U.S. Cl.
CPC ............ *G06Q 30/02* (2013.01); *G06Q 10/10* (2013.01); *H04N 7/17318* (2013.01); *H04N 21/25891* (2013.01); *H04N 21/266* (2013.01); *H04N 21/4668* (2013.01); *H04N 21/4788* (2013.01); *H04N 21/654* (2013.01); *H04N 21/6582* (2013.01); *H04L 67/306* (2013.01)

(58) Field of Classification Search
CPC ...................................................... G06Q 30/06
USPC ......................................................... 705/26.7
See application file for complete search history.

(56) References Cited

U.S. PATENT DOCUMENTS

| | | | |
|---|---|---|---|
| 4,870,579 | A | 9/1989 | Hey |
| 5,621,456 | A | 4/1997 | Florin et al. |
| 5,771,778 | A | 6/1998 | MacLean, IV |
| 5,956,027 | A | 9/1999 | Krishnamurthy |

(Continued)

FOREIGN PATENT DOCUMENTS

| | | |
|---|---|---|
| CN | 1208930 A | 2/1999 |
| EP | 0898278 A2 | 2/1999 |

(Continued)

OTHER PUBLICATIONS

Kaji et al., A Music Recommendation System Based on Annotations and Listeners' Preferences and Situations, 2005, entire document.*

(Continued)

*Primary Examiner* — Mila Airapetian

(57) ABSTRACT

A method and system are provided for simulating recommendations for unavailable users in a social media recommendation network. In general, the social media recommendation network is formed such that each user in the social media recommendation network sends and receives recommendations from their friends. When one of the users in the social media recommendation network is unavailable, a recommendation simulator operates to simulate recommendations from the unavailable user. When the user once again becomes available, the recommendation simulator ceases simulation of recommendations from the user.

23 Claims, 10 Drawing Sheets

(56) References Cited

U.S. PATENT DOCUMENTS

| | | |
|---|---|---|
| 5,960,437 A | 9/1999 | Krawchuk et al. |
| 5,963,916 A | 10/1999 | Kaplan |
| 6,134,552 A | 10/2000 | Fritz et al. |
| 6,195,657 B1 | 2/2001 | Rucker et al. |
| 6,266,649 B1 | 7/2001 | Linden et al. |
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |
| 6,498,955 B1 | 12/2002 | McCarthy et al. |
| 6,507,727 B1 | 1/2003 | Henrick |
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,609,253 B1 | 8/2003 | Swix et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,865,600 B1 | 3/2005 | Brydon et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 | 5/2006 | Schleicher et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,463,890 B2 | 12/2008 | Herz et al. |
| 7,469,283 B2 | 12/2008 | Eyal et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,523,156 B2 | 4/2009 | Giacalone, Jr. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,676,753 B2 | 3/2010 | Bedingfield |
| 7,680,959 B2 | 3/2010 | Svendsen |
| 7,720,871 B2 | 5/2010 | Rogers et al. |
| 7,725,494 B2 | 5/2010 | Rogers et al. |
| 7,730,216 B1 | 6/2010 | Issa et al. |
| 7,751,773 B2 | 7/2010 | Linden |
| 7,761,399 B2 | 7/2010 | Evans |
| 7,805,129 B1 | 9/2010 | Issa et al. |
| 7,827,110 B1 | 11/2010 | Wieder |
| 7,865,522 B2 | 1/2011 | Purdy et al. |
| 7,970,922 B2 | 6/2011 | Svendsen |
| 8,030,564 B2 * | 10/2011 | Komori et al. .................. 84/610 |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2002/0194356 A1 | 12/2002 | Chan et al. |
| 2002/0198882 A1 * | 12/2002 | Linden et al. .................. 707/10 |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0137531 A1 | 7/2003 | Katinsky et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |

(56) References Cited

U.S. PATENT DOCUMENTS

| | | |
|---|---|---|
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0059260 A1 | 3/2006 | Kelly et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0184558 A1 | 8/2006 | Martin et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0218613 A1 | 9/2006 | Bushnell |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0033292 A1 | 2/2007 | Sull et al. |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0282949 A1 | 12/2007 | Fischer et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052380 A1 | 2/2008 | Morita et al. |
| 2008/0052630 A1 | 2/2008 | Rosenbaum et al. |

(56) References Cited

U.S. PATENT DOCUMENTS

| | | |
|---|---|---|
| 2008/0059422 A1 | 3/2008 | Tenni et al. |
| 2008/0059576 A1 | 3/2008 | Liu et al. |
| 2008/0085769 A1 | 4/2008 | Lutnick et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1* | 6/2008 | Fischer .................. 715/747 |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0176562 A1 | 7/2008 | Howard |
| 2008/0181536 A1 | 7/2008 | Linden |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0209013 A1 | 8/2008 | Weel |
| 2008/0228945 A1 | 9/2008 | Yoon et al. |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0250067 A1 | 10/2008 | Svendsen |
| 2008/0250312 A1 | 10/2008 | Curtis |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0301186 A1 | 12/2008 | Svendsen |
| 2008/0301187 A1 | 12/2008 | Svendsen |
| 2008/0301240 A1 | 12/2008 | Svendsen |
| 2008/0301241 A1 | 12/2008 | Svendsen |
| 2008/0306826 A1 | 12/2008 | Kramer et al. |
| 2008/0307462 A1 | 12/2008 | Beetcher et al. |
| 2008/0307463 A1 | 12/2008 | Beetcher et al. |
| 2008/0313541 A1 | 12/2008 | Shafton et al. |
| 2008/0319833 A1 | 12/2008 | Svendsen |
| 2009/0006368 A1 | 1/2009 | Mei et al. |
| 2009/0006374 A1 | 1/2009 | Kim et al. |
| 2009/0007198 A1 | 1/2009 | Lavender et al. |
| 2009/0013347 A1 | 1/2009 | Ahanger et al. |
| 2009/0042545 A1 | 2/2009 | Avital et al. |
| 2009/0046101 A1 | 2/2009 | Askey et al. |
| 2009/0048992 A1 | 2/2009 | Svendsen et al. |
| 2009/0049030 A1 | 2/2009 | Svendsen et al. |
| 2009/0049045 A1 | 2/2009 | Askey et al. |
| 2009/0055385 A1 | 2/2009 | Jeon et al. |
| 2009/0055396 A1 | 2/2009 | Svendsen et al. |
| 2009/0055467 A1 | 2/2009 | Petersen |
| 2009/0055759 A1 | 2/2009 | Svendsen |
| 2009/0069911 A1 | 3/2009 | Stefik |
| 2009/0069912 A1 | 3/2009 | Stefik |
| 2009/0070184 A1 | 3/2009 | Svendsen |
| 2009/0070185 A1 | 3/2009 | Farrelly |
| 2009/0070350 A1 | 3/2009 | Wang |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077124 A1 | 3/2009 | Spivack et al. |
| 2009/0077220 A1 | 3/2009 | Svendsen et al. |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0083541 A1 | 3/2009 | Levine |
| 2009/0089288 A1 | 4/2009 | Petersen |
| 2009/0093300 A1 | 4/2009 | Lutnick et al. |
| 2009/0094248 A1 | 4/2009 | Petersen |
| 2009/0119294 A1 | 5/2009 | Purdy et al. |
| 2009/0125588 A1 | 5/2009 | Black et al. |
| 2009/0129671 A1 | 5/2009 | Hu et al. |
| 2009/0132527 A1 | 5/2009 | Sheshagiri et al. |
| 2009/0157795 A1 | 6/2009 | Black |
| 2009/0164429 A1 | 6/2009 | Svendsen et al. |
| 2009/0177301 A1 | 7/2009 | Hayes |
| 2010/0031366 A1 | 2/2010 | Knight et al. |
| 2010/0185732 A1 | 7/2010 | Hyman |
| 2011/0016483 A1 | 1/2011 | Opdycke |
| 2011/0034121 A1 | 2/2011 | Ng et al. |
| 2011/0184899 A1* | 7/2011 | Gadanho et al. ............ 706/46 |

FOREIGN PATENT DOCUMENTS

| | | |
|---|---|---|
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |
| WO | 2007092053 A1 | 8/2007 |

OTHER PUBLICATIONS

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Apple—iPod classic," http://www.apple.com/ipodclassic/, printed Oct. 26, 2007, 1 page.

"BetterPropaganda—Free MP3s and music videos.," http://www.betterpropaganda.com/, copyright 2004-2005 betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

"ChoiceStream Technology Brief, Review of Personalization Technologies: Collaborative Filtering vs. ChoiceStream's Attributized Bayesian Choice Modeling," 13 pages.

"The Classic TV Database—Your Home for Classic TV!—www.classic-tv.com," http://www.classic-tv.com, copyright The Classic TV Database—www.classic-tv.com, printed Feb. 7, 2007, 3 pages.

"Digital Tech Life>>Download of the Week," http://www.digitaltechlife.com/category/download-of-the-week/, printed Feb. 16, 2007, 9 pages.

"MP3 music download website, eMusic," http://www.emusic.com/, copyright 2007 eMusic.com Inc., printed Feb. 7, 2007, 1 page.

"GenieLab::Music Recommendation System," http://web.archive.org/web/20060813000442/http://genielab.com/, copyright 2005 GenieLab, LLC, printed Oct. 26, 2007, 1 page.

"The Daily Barometer—GenieLab.com grants music lovers' wishes," http://media.barometer.orst.edu/home/index.cfm?event=displayArticlePrinterFriendly&uSt . . . , copyright 2007 The Daily Barometer, printed Feb. 16, 2007, 2 pages.

"Gracenote Playlist," Revised Dec. 29, 2005, 2 pages.

"Gracenote Playlist Plus," Revised Dec. 29, 2005, 2 pages.

"Gracenote," http://www.gracenote.com, printed Feb. 7, 2007, 1 page.

"IEEE 802.11—Wikipedia, the free encyclopedia," http://en.wikipedia.org/wiki/IEEE_802.11, printed Oct. 26, 2007, 5 pages.

(56) References Cited

OTHER PUBLICATIONS

"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Apple—iPod + iTunes," http://www.apple.com/itunes/, copyright 2007 Paramount Pictures, printed Feb. 7, 2007, 2 pages.
"Last.fm the social music revolution," 1 page.
"Last.fm—Wikipedia, the free encyclopedia," http://en.wikipedia.org/wiki/Last.fm, printed Aug. 8, 2006, 7 pages.
"LimeWire—Wikipedia, the free encyclopedia," http://en.wikipedia.org/wiki/LimeWire, printed Aug. 8, 2006, 2 pages.
"Liveplasma music, movies, search engine and discovery engine," http://www.liveplasma.com, printed May 17, 2007, 1 page.
"Loomia—Personalized Recommendations for Media, Content and Retail Sites," http://www.loomia.com/, copyright 2006-2007 Loomia Inc., printed Feb. 7, 2007, 2 pages.
"Mercora—Music Search and Internet Radio Network," http://www.mercora.com/overview.asp, copyright 2004-2006 Mercora, Inc., printed Aug. 8, 2006, 1 page.
"Mercora—Music Search and Internet Radio Network," http://www.mercora.com/v6/_front/web.jsp, printed Feb. 7, 2007, 1 page.
"Outlook Home Page—Microsoft Office Online," http://office.microsoft.com/en-us/outlook/default.aspx, copyright 2007 Microsoft Corporation, printed Nov. 8, 2007, 1 page.
"Welcome to the MUSICMATCH Guide," http://www.mmguide.musicmatch.com/, copyright 2001-2004 Musicmatch, Inc., printed Feb. 7, 2007, 1 page.
"Mongomusic.com—The Best Download mp3 Resources and Information. This website is for sale!," http://www.mongomusic.com/, printed May 17, 2007, 2 pages.
"Thunderbird—Reclaim your inbox," http://www.mozilla.com/en-US/thunderbird/, copyright 2005-2007 Mozilla, printed Nov. 8, 2007, 2 pages.
"Take a look at the Future of Mobile Music :: MUSIC GURU," http://www.symbian-freak.com/news/006/02/music_guru.htm, copyright 2005 Symbian freak, printed Feb. 7, 2007, 3 pages.
"Music Recommendations 1.0—MacUpdate," http://www.macupdate.com/info.php/id/19575, printed Feb. 16, 2007, 1 page.
"MusicGremlin," http://www.musicgremlin.com/StaticContent.aspx?id=3, copyright 2005, 2006, 2007 MusicGremlin, Inc., printed Oct. 26, 2007, 1 page.
"MusicIP—The Music Search Engine," http://www.musicip.com/, copyright 2006-2007 MusiciP Corporation, printed Feb. 7, 2007, 1 page.
"Digital Music News," http://www.digitalmusicnews.com/results?title=musicstrands, copyright 2003-6 Digital Music News, printed Aug. 8, 2006, 5 pages.
"Musicstrands.com Because Music is Social," copyright 2006 MusicStrands, Inc., 2 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.
"MyStrands Download," http://www.mystrands.com/overview.vm, printed Feb. 7, 2007, 3 pages.
"Napster—All the Music You Want," http://www.napster.com/using_napster/all_the_music_you_want.html, copyright 2003-2006 Napster, LLC, printed Feb. 7, 2007, 2 pages.
"Try Napster free for 7 Days—Play and download music without paying per song.," http://www.napstercom/choose/index.html, copyright 2003-2007 Napster, LLC, printed Feb. 7, 2007, 1 page.
"FAQ," http://blog.pandora.com/faq/, copyright 2005-2006 Pandora Media, Inc., printed Aug. 8, 2006, 20 pages.
"Pandora Internet Radio—Find New Music, Listen to Free Web Radio," http://www.pandora.com/, copyright 2005-2007 Pandora Media, Inc., printed Feb. 7, 2007, 1 page.

"Pandora Radio—Listen to Free Internet Radio, Find New Music," http://www.pandora.com/mgp, copyright 2005-2007 Pandora Media, Inc., printed Oct. 26, 2007, 1 page.
"RYM FAQ—Rate Your Music," http://rateyourmusic.com/faq/, copyright 2000-2007 rateyourmusic.com, printed Nov. 8, 2007, 14 pages.
"Rhapsody—Full-length music, videos and more—Free," http://www.rhapsody.com/welcome.html, copyright 2001-2007 Listen.com, printed Feb. 7, 2007, 1 page.
Badrul M. Sarwar et al., "Recommender Systems for Large-scale E-Commerce: Scalable Neighborhood Formation Usning Clustering," 2002, 6 pages.
"Soundflavor," http://www.soundflavor.com/, copyright 2003-2007 Soundflavor, Inc., printed Feb. 7, 2007, 1 page.
"That canadian girl>>Blog Archive>>GenieLab," http://www.thatcanadiangirl.co.uk/blog/2005/02/22/genielab/, copyright 2007 Vero Pepperrell, printed Feb. 16, 2007, 3 pages.
"Trillian (software)—Wikipedia, the free encyclopedia," http://en.wikipedia.org/wiki/Trillian_(instant_messenger), printed Nov. 8, 2007, 11 pages.
"UpTo11.net—Music Recommendations and Search," http://www.upto11.net/, copyright 2005-2006 Upto11.net, printed Feb. 7, 2007, 1 page.
"Webjay—Playlist Community," http://www.webjay.org/, copyright 2006 Yahoo! Inc., printed Feb. 7, 2007, 5 pages.
"Wired News:," http://www.wiredcom/news/digiwoo/1,57634-0.html, copyright 2005 Lycos, Inc., printed Oct. 9, 2006, 3 pages.
"Not safe for work—Wikipedia, the free encyclopedia," http://en.wikipedia.org/wiki/Work_safe, printed Nov. 8, 2007, 2 pages.
"Yahoo! Messenger—Chat, Instant message, SMS, PC Calls and More," http://messenger.yahoo.com/wbmessengerpromo.php, copyright 2007 Yahoo! Inc., printed Oct. 26, 2007, 1 page.
"Yahoo Music Jukebox—Wikipedia, the free encyclopedia," http://en.wikipedia.org/wiki/Yahoo_music_engine, printed Aug. 8, 2006, 1 page.
"LAUNCHcast Radio—Yahoo! Messenger," http://messenger.yahoo.com/launch.php, copyright 2007 Yahoo! Inc., printed Nov. 8, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
"Zune.net—How-To—Share Audio Files Zune to Zune," http://web.archive.org/web/20070819121705/http://www.zune.net/en-us/supportlhowto/z . . . , copyright 2007 Microsoft Corporation, printed Nov. 14, 2007, 2 pages.
"Goombah—Preview," http://www.goombah.com/preview.html, printed Jan. 8, 2008, 5 pages.
Jeff Mascia et al., "Lifetrak: Music in Tune With Your Life," copyright 2006, 11 pages.
Jun Wang et al., "Music Recommender System for Wi-Fi Walkman," Delft University of Technology, 23 pages.
Barrie-Anthony, Steven, "That song sounds familiar," Los Angeles Times, Feb. 3, 2006, available from http://www.calendarlive.com/printedition/calendar/c-et-pandora3feb03,0,7458778.story?track=tottext,0,19432.story?track=tothtml, 5 pages.
Cai, Rui et al., "Scalable Music Recommendation by Search," Proc. ACM Multimedia, Augsburg, Germany, Sep. 2007, pp. 1065-1074.
Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
Yahoo! Music downloaded archival page from www.archive.org for Jun. 20, 2005, copyright 2005 Yahoo! Inc., 14 pages.
"Hulu—About," www.hulu.com/about/product_tour, copyright 2010 Hulu LLC, printed Jun. 15, 2010, 2 pages.

(56) References Cited

OTHER PUBLICATIONS

Nilson, Martin, "id3v2.4.0-frames—ID3.org," http://www.id3.org/id3v2.4.0-frames, Nov. 1, 2000, copyright 1998-2009, printed Jun. 15, 2010, 31 pages.
"Songbird," http://getsongbird.com/, copyright 2010 Songbird, printed Jun. 15, 2010, 2 pages.
"SongReference," http://songreference.com/, copyright 2008, SongReference.com, printed Jun. 15, 2010, 1 page.
"Ringo: Social Information Filtering for Music Recommendation," http://jolomo.net/ringo.html, printed Aug. 3, 2009, 1 page.
"Tour's Profile," http://mog.com/Tour, copyright 2006-2009 Mog Inc., printed Aug. 3, 2009, 11 pages.
"Babulous :: Keep it loud," http://www.babulous.com/home.jhtml, copyright 2009 Babulous, Inc., printed Mar. 26, 2009, 2 pages.
Cohen, William W., "Web-Collaborative Filtering: Recommending Music by Spidering the Web," Computer Networks: The International Journal of Computer and Telecommunications Networking, 33(1-6), pp. 685-698, Jun. 2000, 20 pages.
"MyStrands Labs: Patent-pending Technologies," at <http://labs.mystrands.com/patents.html>, printed Feb. 7, 2007, 5 pages.
Pampalk, E. and Goto, M., "MusicSun: A New Approach to Artist Recommendation," In Proceedings of the 8th International Conference on Music Information Retrieval (ISMIR 2007), Vienna, Austria, Sep. 23-27, 2007, copyright 2007, Austrian Computer Society (OCG), found at <http://citeseerx.ist.psu.edu/viewdoc/download-?doi=10.1.1.69.1403&rep=rep1&type=pdf>, 4 pages.
Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8, 2005, found at <http://citeseerx.ist.psu.edu/viewdoc/download-?doi=10.1.1.108.3459&rep=rep1&type=pdf>, 10 pages.
Aaron Gitzen, "STIC Search Report EIC 3600," Apr. 5, 2012, 32 pages.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
"Identifying iPod models," http://support.apple.com/kb/HT1353, printed Feb. 24, 2010, 13 pages.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.

\* cited by examiner

METHOD AND SYSTEM FOR SIMULATING RECOMMENDATIONS IN A SOCIAL NETWORK FOR AN OFFLINE USER

FIELD OF THE INVENTION

The present invention relates to a social media recommendation network.

BACKGROUND OF THE INVENTION

Social networks are becoming prolific in today's digital society. For example, instant messaging and chat applications enable a user to create a social network of friends or buddies. The friends may be classified into types or groups such as friends, family, co-workers, and the like. As another example, social networking websites such as MySpace allow users to create social networks of friends with which they are enabled to communicate.

Social networks are emerging as a means for recommending media content among users. Commonly owned and assigned U.S. patent application Ser. No. 11/484,130, entitled P2P NETWORK FOR PROVIDING REAL TIME MEDIA RECOMMENDATIONS, discloses an exemplary social network based media recommendation system, which is referred to herein as a social media recommendation network. One issue with such systems is that the number of recommendations received by any one user can significantly decrease when another user in the social media recommendation network becomes unavailable. Thus, there is a need for a system and method for eliminating or alleviating significant reduction in recommendation flow in a social media recommendation network when a user becomes unavailable, while preserving the natural flow of recommendations through the system.

SUMMARY OF THE INVENTION

The present invention relates to simulating recommendations for unavailable users in a social media recommendation network. In general, the social media recommendation network is formed such that each user in the social media recommendation network sends and receives recommendations from their friends. When one of the users in the social media recommendation network is unavailable, a recommendation simulator operates to simulate recommendations from the unavailable user. When the user once again becomes available, the recommendation simulator ceases simulation of recommendations from the user.

More specifically, in one embodiment, each user is associated with a recommendation client that receives recommendations for media items from recommendation clients of the friends of the user. The recommendation client may score the recommended media items and, optionally, media items from a media collection of the user. The scores may be used by the recommendation client to programmatically select media items for playback from the recommended media items and, optionally, the media items in the user's media collection. In response to playback of the selected media items, the recommendation client sends corresponding recommendations to the recommendation clients of the friends of the user.

Prior to the user becoming unavailable, the recommendation simulator obtains client context information from the recommendation client of the user. The client context information may include, for example, user preferences used for scoring media items, a list of media items in the user's media collection and their scores, a list of media items previously recommended to the user and their scores, and the like. When the user becomes unavailable, the recommendation simulator simulates the recommendation client of the user using the client context information. As such, in one embodiment, the recommendation simulator receives recommendations on behalf of the user, scores the recommended media items, programmatically selects media items for playback, simulates playback of the selected media items, and sends recommendations to the recommendation clients of the friends of the user in response to the simulated playback of the selected media items.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
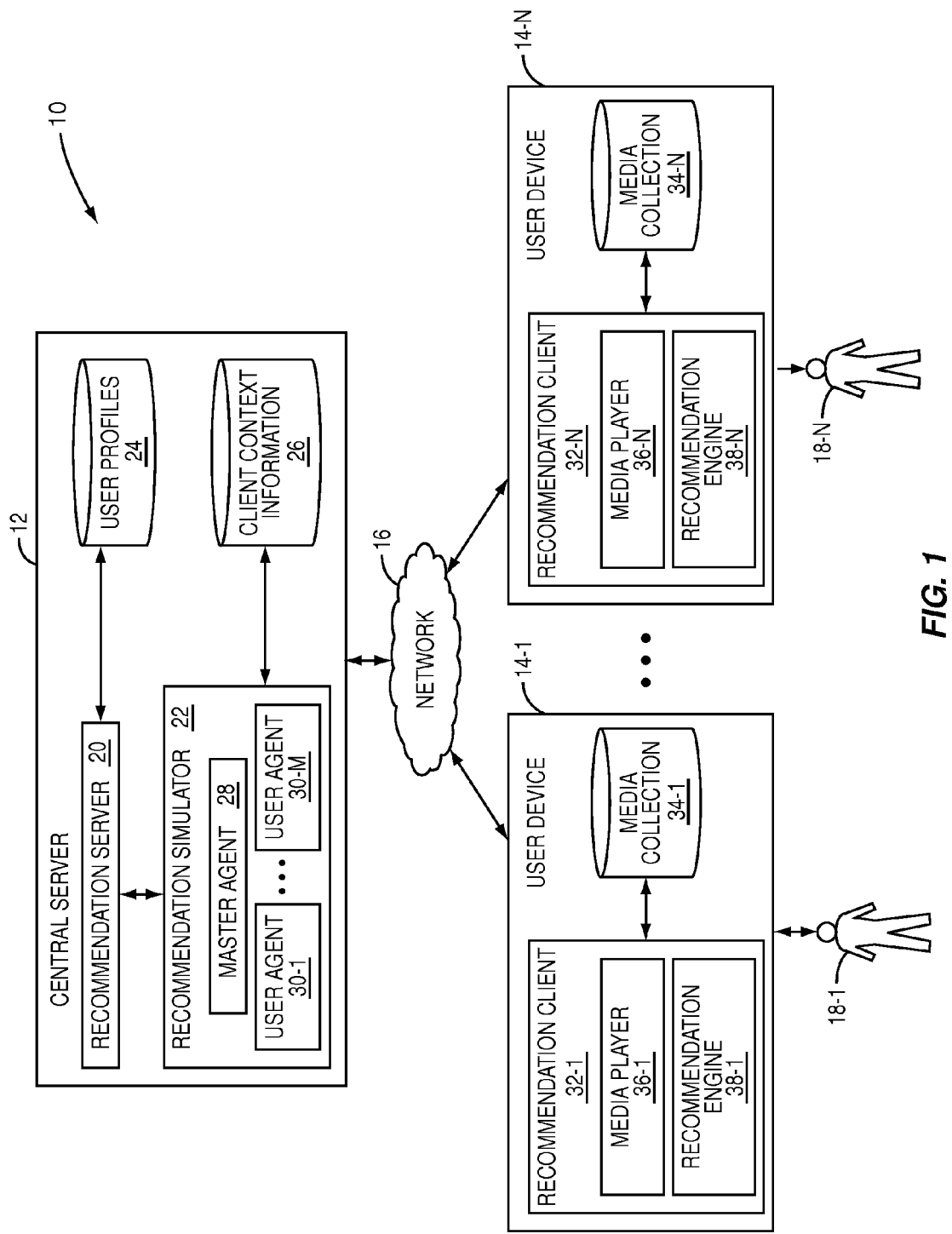
FIG. 1 illustrates a system including a recommendation simulator for simulating recommendations from an unavailable user in a social media recommendation network according to one embodiment of the present invention.

FIG. 1 illustrates a system 10 that simulates recommendations from unavailable users in a social media recommendation network according to one embodiment of the present invention. In general, the system 10 includes a central server 12 and a number of user devices 14-1 through 14-N connected via a network 16. The network 16 is also referred to herein as a communication network. The network 16 may be any type of Wide Area Network (WAN) or Local Area Network (LAN), or any combination thereof. In addition, the network 16 may include wired components, wireless components, or both wired and wireless components. Users 18-1 through 18-N are associated with the user devices 14-1 through 14-N. Note that while a single central server 12 is illustrated in FIG. 1, the present invention is not limited thereto. The functionality of the central server 12 may alternatively be distributed among multiple servers.

The central server 12 includes a recommendation server 20, a recommendation simulator 22, user profiles 24, and client context information 26. The recommendation server 20 is preferably implemented in software. However, the recommendation server 20 may be implemented in software, hardware, or a combination of software and hardware. In general, the recommendation server 20 provides centralized functionality of the social recommendation network such as, for example, user profile management and recommendation forwarding. With respect to recommendation forwarding, in one embodiment, the recommendation server 20 operates to forward recommendations from, for example, the user device 14-1 of the user 18-1 to other user devices from the user devices 14-2 through 14-N having associated users that are friends of the user 18-1. As used herein, a friend of the user 18-1 is another user identified by the user 18-1 as a user from which the user 18-1 desires to receive recommendations and/or to which the user 18-1 desires to send recommendations. The friends of the user 18-1 may be manually selected or otherwise identified by the user 18-1, programmatically selected by, for example, the central server 12 using a user profile matching technique, or the like. Further, the user 18-1 may classify friends into a number of types or groups, such as friends, family, and co-workers. If such types or groups are used, the user 18-1 may select or otherwise identify whether recommendations are to be provided to all friends or one or more select types of friends either manually or via user preferences. How recommendations are distributed among types or groups of friends may be controlled based on time of day, type or other classification of the media item to be recommended, or the like. For example, during the day, the user 18-1 may specify that recommendations are to be provided to friends classified as co-workers and that during the evening recommendations are to be provided to friends classified as friends and family.

The recommendation simulator 22 is preferably implemented in software. However, the recommendation simulator 22 may be implemented in software, hardware, or a combination of software and hardware. In general, the recommendation simulator 22 includes a master agent 28 that detects, or otherwise determines, when the users 18-1 through 18-N are unavailable and, in response, initiates user agents 30-1 through 30-M, which operate to simulate recommendations from the unavailable users. More specifically, when, for example, the user 18-1 is unavailable, the master agent 28 initiates one of the user agents 30-1 through 30-M to simulate recommendations from the user 18-1. The user 18-1 is unavailable when, for example, the user device 14-1 is unable to connect to the network 16, when the user 18-1 has chosen to disconnect from the recommendation server 20 or has otherwise chosen to enter an offline state with respect to the social recommendation network, when a bandwidth of a connection between the user device 14-1 and the central server 12 falls below a threshold, when the user 18-1 is at a predefined location such as work, when the user 18-1 becomes inactive, when the user 18-1 explicitly initiates simulation, when simulation has been scheduled, or the like. Note that the number of user agents 30-1 through 30-M at any one time depends on the number of the users 18-1 through 18-N that are unavailable at that time. Alternatively, there may be a static number of user agents 30-1 through 30-M that are allocated as the users 18-1 through 18-N become unavailable.

The user profiles 24 include a user profile for each of the users 18-1 through 18-N. Using the user 18-1 as an example, in one embodiment, a user profile includes a list of friends of the user 18-1. The friends are other users from the users 18-2 through 18-N to which the user 18-1 sends recommendations and from which the user 18-1 receives recommendations. The user profile of the user 18-1 may also include simulation preferences of the user 18-1, which are discussed below. In addition, the user profile of the user 18-1 may include user preferences of the user 18-1 used to, for example, score media items or otherwise select media items for playback at the user device 14-1. In one embodiment, the user preferences include multiple user preference sets, where each user preference set corresponds to what is referred to herein as a media channel. For example, the user preferences may include a user preference set for a "Rock" media channel and a "1980s Rock" media channel. As discussed below, when the Rock media channel is selected, the corresponding user preference set is used to select media items from the Rock music genre for playback at the user device 14-1. When the 1980s Rock media channel is selected, the corresponding user preference set is used to select media items from the Rock music genre that were released in the 1980s for playback at the user device 14-1. Note that the user preferences may alternatively be stored in the client context information 26.

The client context information 26 includes client contexts for recommendation clients 32-1 through 32-N of each of the users 18-1 through 18-N. The client context information 26 depends on the particular implementation of the recommendation clients 32-1 through 32-N. In general, the client contexts provide information needed by the recommendation simulator 22 in order to simulate the recommendation clients 32-1 through 32-N when the users 18-1 through 18-N are offline. A more detailed description of the client context information 26 is provided below with respect to exemplary embodiments of the present invention.

The user devices 14-1 through 14-N may each be a personal computer, a mobile device such as a mobile telephone having media playback and network capabilities, a set-top box having media playback and network capabilities, a gaming console having media playback and network capabilities, some other consumer device having media playback and network capabilities, or the like. The user devices 14-1 through 14-N generally include the recommendation clients 32-1 through 32-N and user media collections 34-1 through 34-N (hereinafter media collections 34-1 through 34-N), respectively. The recommendation clients 32-1 through 32-N are preferably implemented in software. However, the present invention is not limited thereto. The recommendation clients 32-1 through 32-N may be implemented in software, hardware, or a combination of software and hardware.

In this embodiment, the recommendation clients 32-1 through 32-N include media players 36-1 through 36-N and recommendation engines 38-1 through 38-N, respectively. Note that the media players 36-1 through 36-N may alternatively be implemented separately from the recommendation clients 32-1 through 32-N. For example, the recommendation clients 32-1 through 32-N may be implemented as plug-ins for the media players 36-1 through 36-N. The media collections 34-1 through 34-N include media items accessible to the users 18-1 through 18-N, respectively. For example, the media collections 34-1 through 34-N may include media items owned or otherwise acquired by the corresponding users 18-1 through 18-N. The media items may be stored locally at the user devices 14-1 through 14-N or stored remotely by an associated device or server. The media items may be, for example, songs, videos, audio books, or the like.

Using the user device 14-1 as an example, the recommendation engine 38-1 operates to send recommendations to and receive recommendations from one or more of the other recommendation clients 32-2 through 32-N associated users that are identified as friends of the user 18-1. More specifically, in one embodiment, the recommendation engine 38-1 operates to programmatically select media items to play from media items identified by recommendations received by the recommendation client 32-1 from the recommendation clients of the friends of the user 18-1 and, optionally, the media items in the media collection 34-1 of the user 18-1 using the user preferences of the user 18-1. The recommendation engine 38-1 triggers playback of the selected media items by the media player 36-1. In response to playback of the selected media items, the recommendation engine 38-1 sends recommendations for the played media items to the recommendation server 20, which then forwards the recommendations to the friends of the user 18-1. For more information of this exemplary embodiment of the recommendation engine 38-1, the interested reader is directed to U.S. patent application Ser. No. 11/484,130, entitled P2P NETWORK FOR PROVIDING REAL TIME MEDIA RECOMMENDATIONS, which was filed on Jul. 11, 2006 and is hereby incorporated herein by reference in its entirety.

Figure 2A:
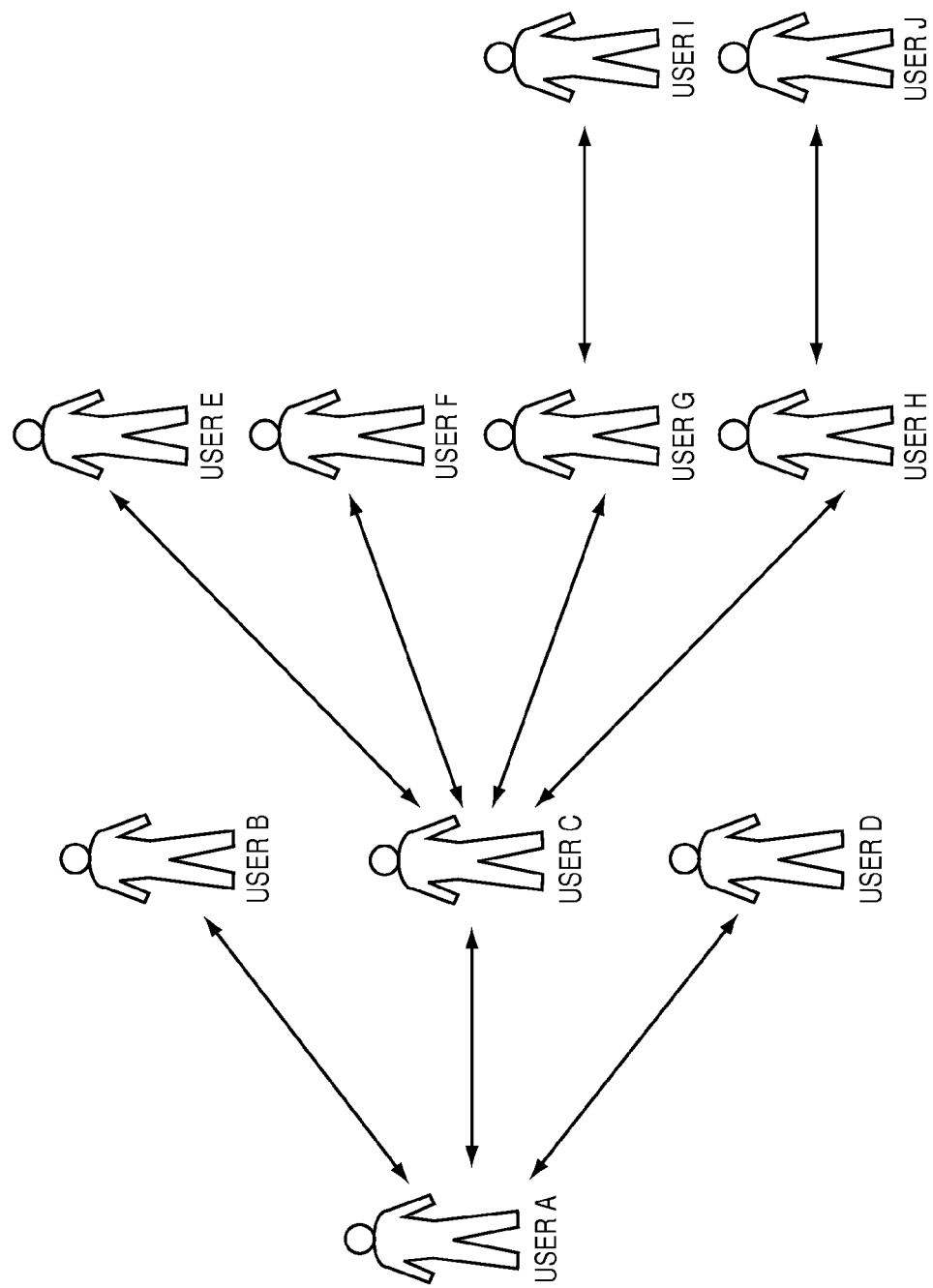
FIGS. 2A and 2B illustrate an exemplary social network and the typical effect of an unavailable user when recommendations from the unavailable user are not simulated according to the present invention.

Before proceeding to discuss the details of the present invention, it may be beneficial to discuss the effect of an unavailable user in a social recommendation network. FIG. 2A illustrates an exemplary social recommendation network. In this example, users B, C, and D are friends of user A. Users E, F, G, and H are friends of user C. User I is a friend of user G, and user J is a friend of user H. As such, user A sends recommendations to and receives recommendations from users B, C, and D. User C sends recommendations to and receives recommendations from users A, E, F, G, and H. User G sends recommendations to and receives recommendations from users C and I. User H sends recommendations to and receives recommendations from users C and J. Thus, as a result of friend and friend-of-friend relationships, user A may directly or indirectly receive recommendations from all of the other users B through J. Further, recommendations originating from user A may be propagated to all of the other users B through J.

Figure 2B:
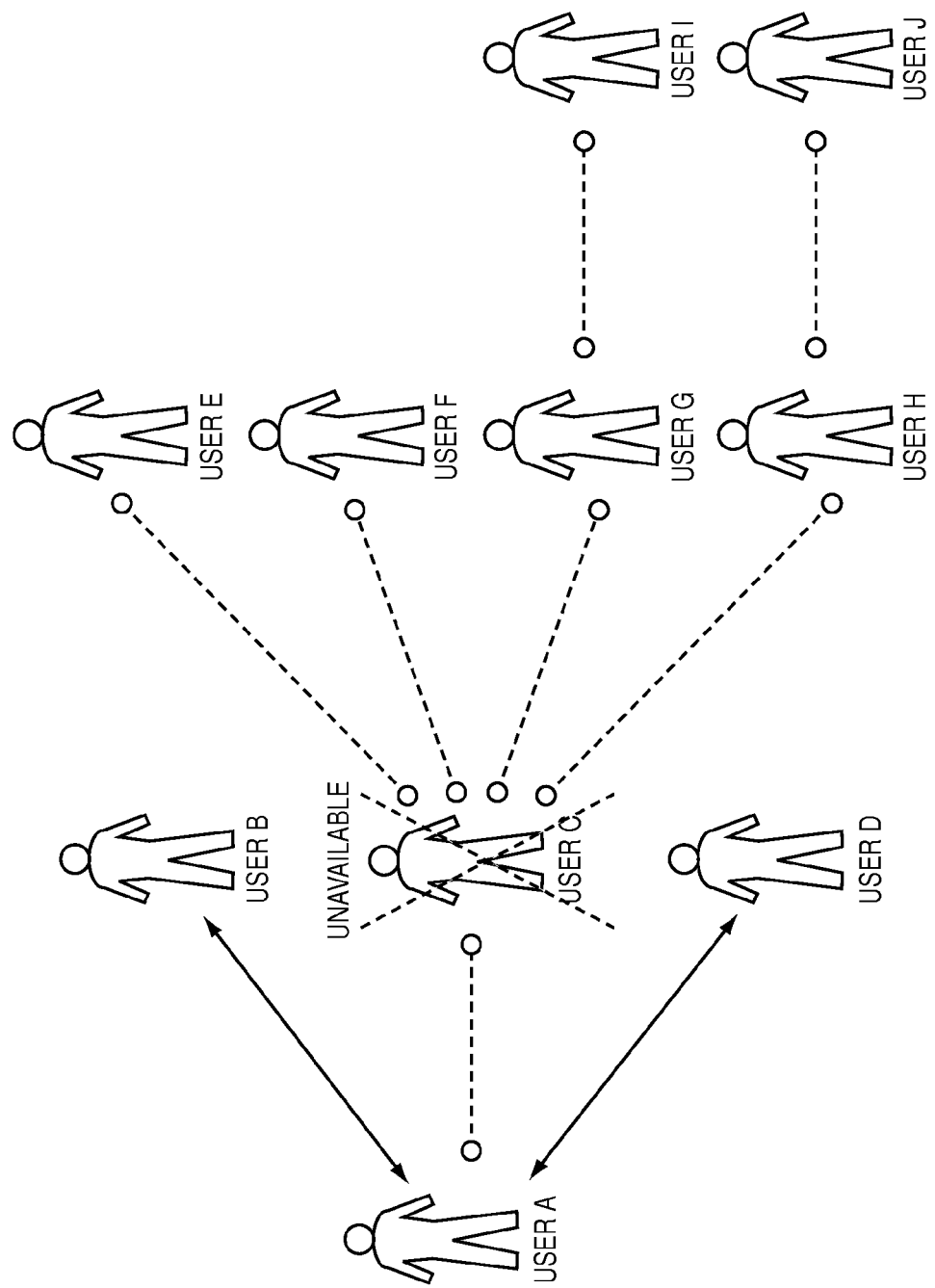

However, as illustrated in FIG. 2B, if user C becomes unavailable, much of the social network becomes unavailable to user A. User A can no longer receive recommendations originating at the users E, F, G, H, I, and J. As a result, the number of recommendations received by user A may dramatically decrease. However, if recommendations from user C are simulated according to the present invention, recommendations will be sent and received in essentially the same manner as if user C were available.

Figure 3:
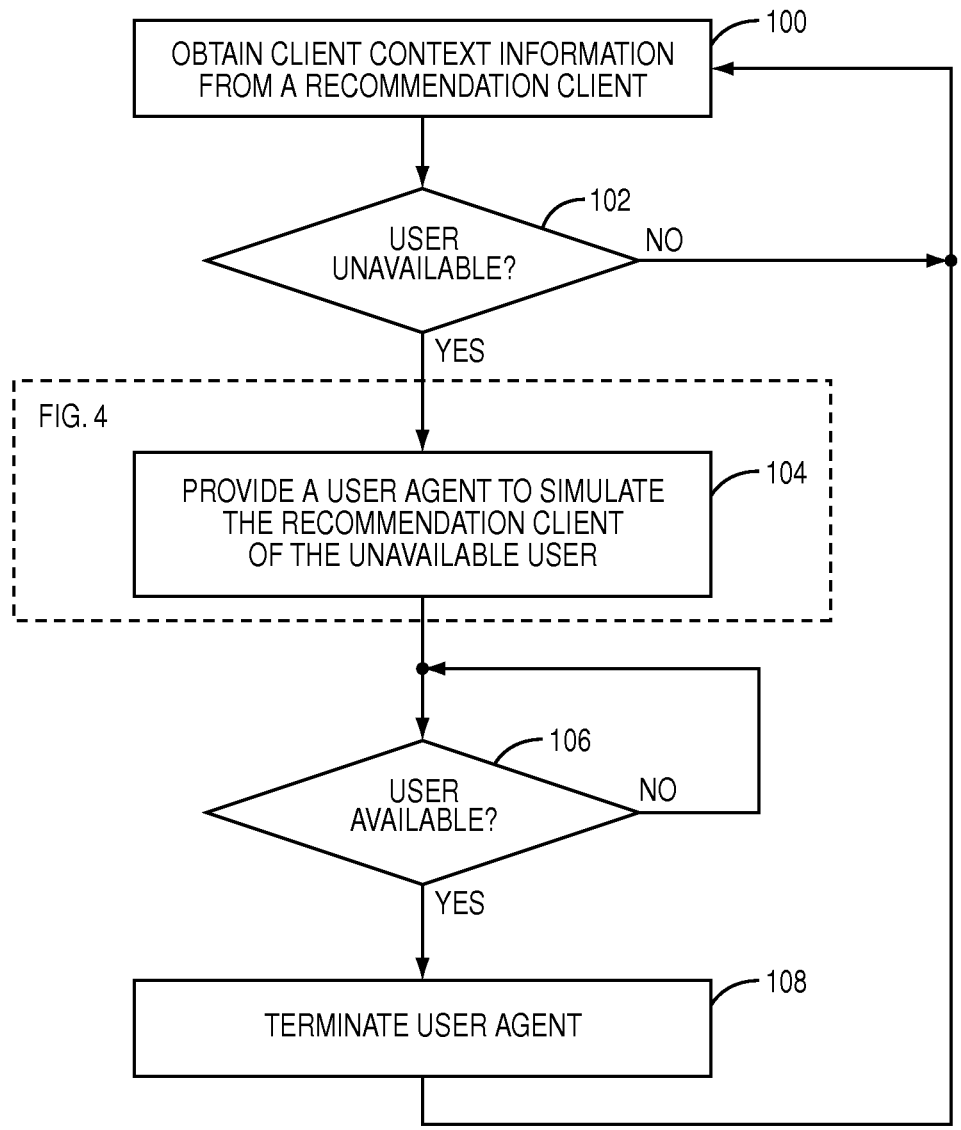
FIG. 3 is a flow chart illustrating the operation of a master agent of the recommendation simulator of FIG. 1 according to one embodiment of the present invention.

FIG. 3 is a flow chart illustrating the operation of the master agent 28 of the recommendation simulator 22 of FIG. 1 according to one embodiment of the present invention. Note that the master agent 28 performs the following process for each of the recommendation clients 32-1 through 32-N. First, the master agent 28 obtains the client context from a recommendation client, which for this example is the recommendation client 32-1 (step 100). The master agent 28 may obtain the client context from the recommendation client 32-1 in any desired manner. For example, the master agent 28 may periodically request the client context, or updates thereto, from the recommendation client 32-1. As another example, the recommendation client 32-1 may periodically send the client context, or updates thereto, to the recommendation simulator 22. As a final example, if the user 18-1 chooses to go offline, the recommendation client 32-1 may send the client context to the recommendation simulator 22 prior to allowing the user 18-1 to go offline or as part of a process for taking the user 18-1 offline.

The exact information contained in the client context varies depending on the implementation of the recommendation client 32-1. In general, the client context is information needed by the recommendation simulator 22 to simulate the recommendation client 32-1 when the user 18-1 is offline. For example, the client context may include information referring to or identifying a collection of media items that drive the recommendations of the user 18-1, user preferences of the user 18-1, demographic information describing the user 18-1, historical usage information for the user 18-1, playlist interactions, or the like.

In one embodiment the recommendation client 32-1 receives recommendations from one or more of the other recommendation clients 32-2 through 32-N associated with friends of the user 18-1; scores a number of media items including the recommended media items, optionally previously recommended media items, and optionally one or more media items from the media collection 34-1 of the user 18-1; programmatically selects media items for playback as a function of their scores; and sends recommendations for the selected media items in response to their playback. In this embodiment, the client context may include, for example, a list of media items including media items previously recommended to the user 18-1 and optionally media items in the media collection 34-1 of the user 18-1 and the scores of the media items in the list. In addition, the client context may include the user preferences used to score the media items. As discussed above, the user preferences may alternatively be stored in the user profile of the user 18-1. Note that if the multiple user preference sets are defined by the user 18-1, the user profile of the user 18-1 may include all of the user preference sets. The client context may then include information identifying one of those sets currently being used to score media items or one of those sets to be used to score media items during simulation.

The master agent 28 of the recommendation simulator 22 also determines whether the user 18-1 has become unavailable (step 102). Numerous techniques may be used for determining whether the user 18-1 has become unavailable. For example, the master agent 28 may periodically ping the recommendation client 32-1. If there is no response, then the master agent 28 may determine that the user 18-1 is unavailable. Alternatively, the recommendation client 32-1 may periodically send a "keep alive" message to the recommendation simulator 22 to inform the recommendation simulator 22 that the user 18-1 is available. Further, explicit actions taken by the user 18-1 may result in the status of the user 18-1 being changed to unavailable or offline. For example, the user 18-1 may choose to log-out of the recommendation network. As another example, if the user 18-1 is inactive for a predetermined period of time, the master agent 28 may determine that the user 18-1 is unavailable. Note that the user 18-1 may also be considered unavailable when, for example, the user 18-1 explicitly initiates simulation, simulation has been scheduled, the bandwidth from the recommendation client 32-1 to the central server 12 falls below a threshold, or the like.

If the user 18-1 is available, the process returns to step 100. If the user 18-1 is unavailable, the master agent 28 provides a user agent, which in this example is the user agent 30-1, for simulating the recommendation client 32-1 of the user 18-1 (step 104). The user agent 30-1 may be provided by initiating a new user agent, by allocating one of the user agents 30-1 through 30-M, or the like. As discussed below, the user agent 30-1 then simulates the recommendation client 32-1 until the user 18-1 is again available or simulation is otherwise terminated.

The master agent 28 then monitors the status of the user 18-1 to determine when the user 18-1 has again become available (step 106). When the user 18-1 is available, the master agent 28 terminates simulation of the recommendation client 32-1 by, in this example, terminating the user agent 30-1 (step 108). Note that the manner in which the user 18-1 again becomes available may vary depending on how the user 18-1 became unavailable. For example, if the user 18-1 became unavailable by logging off of the social media recommendation network, the user 18-1 becomes available when the user 18-1 logs back onto the social media recommendation network. If the user 18-1 became unavailable because the user device 14-1 became disconnected from the network 16, the user 18-1 may become available when the user device 14-1 is able to re-connect to the network 16. If the user 18-1 explicitly initiated simulation, simulation may continue until terminated by the user 18-1 or the expiration of some defined time. If simulation was scheduled by the user 18-1 or scheduled by the recommendation simulator 22, simulation may be terminated at the end of the scheduled time period. If simulation is triggered by the location of the user 18-1, simulation may be terminated when the user 18-1 is no longer at the location resulting in the simulation. As a final example, if simulation is triggered by bandwidth, simulation may be terminated when the bandwidth between the recommendation client 32-1 and the central server 12 increases above a threshold. Once simulation is terminated, the process returns to step 100.

Once simulation is terminated, the recommendation client 32-1 may begin operation from the point where operation ended when the user 18-1 became unavailable. Alternatively, the recommendation simulator 22 may provide a context of the recommendation simulator 22 to the recommendation client 32-1 at the end of simulation. The recommendation client 32-1 may then begin operation where the recommendation simulator 22 left off. The user 18-1 may be given the option of beginning operation where it was when the user 18-1 became unavailable or where the recommendation simulator 22 was when the user 18-1 again became available.

Figure 4:
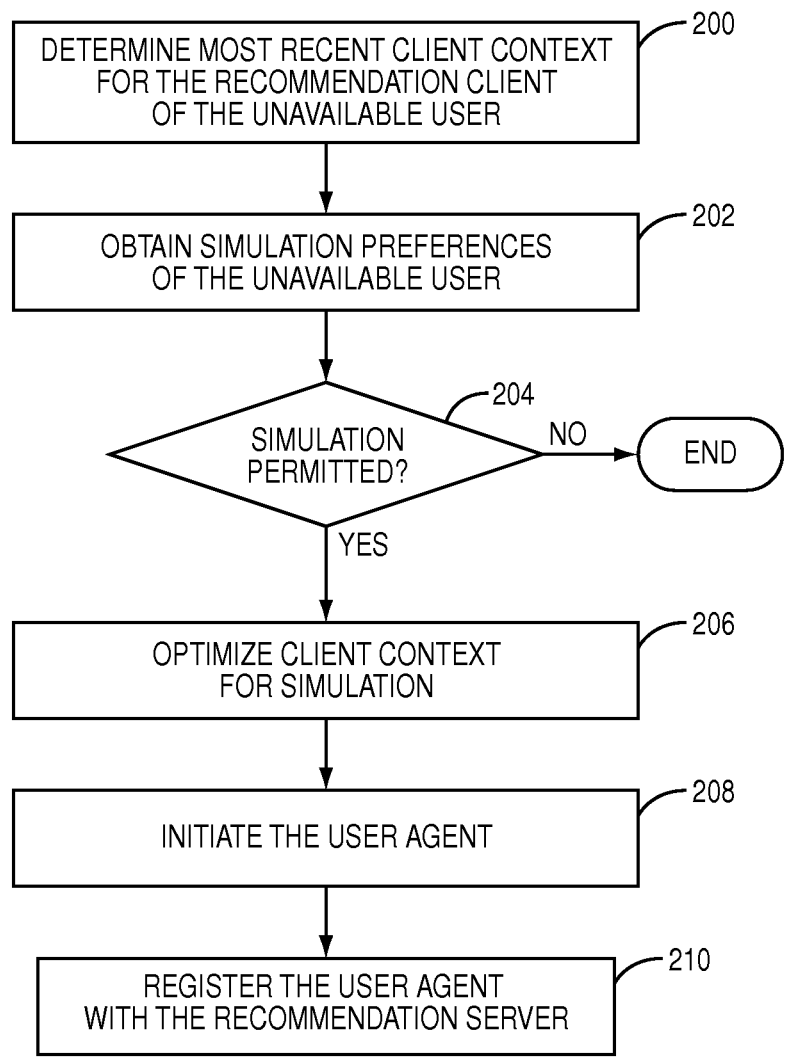
FIG. 4 is a flow chart illustrating initiation, by the master agent of FIG. 3, of a user agent for simulating recommendations of an unavailable user according to one embodiment of the present invention.

FIG. 4 is a more detailed flow chart of step 104 of FIG. 3 according to one embodiment of the present invention. In order to provide the user agent 30-1 for simulating the recommendation client 32-1 of the user 18-1, the master agent 28 first determines the most recent client context of the recommendation client 32-1 (step 200). Note that if the recommendation simulator 22 does not have a client context for the recommendation client 32-1, a default client context or a client context of one of the recommendation clients 32-2 through 32-N associated with a friend of the user 18-1 may be used.

The master agent 28 also obtains simulation preferences of the user 18-1 (step 202). The simulation preferences may be, for example, whether or not simulation is permitted, restrictions on simulation such as time periods in which simulation is or is not permitted, or the like. In addition, if multiple user preference sets are defined by the user 18-1, the simulation preferences may include information identifying a preferred set of user preferences to be used for simulation. Still further, the simulation preferences may include information identifying whether auto-generation of user preferences is to be enabled. Auto-generation of user preferences may be used to define or modify user preferences used for simulation as a function of historical information. For example, if the user 18-1 has defined multiple sets of user preferences for scoring media items and typically switches from a first set of user preferences to a second set of user preferences at 7 PM, then the recommendation simulator 22 may select the first set of user preferences if the current time is before 7 PM and then switch to the second set of user preferences at 7 PM.

Auto-generation of user preferences may also permit the recommendation simulator 22 to modify the user preferences of the user 18-1 during simulation based on user preferences of or the types of content currently being played by friends or friends-of-friends who directly or indirectly receive recommendations from the user 18-1. Alternatively, the friends or friends-of-friends who receive recommendations from the user 18-1 may make explicit requests or votes for the types of content to be played on behalf of the user 18-1 during simulation, where the recommendation simulator 22 modifies the user preferences of the user 18-1 during simulation based on these explicit requests.

In this embodiment, the master agent 28 then determines whether simulation is permitted based on the simulation preferences of the user 18-1 (step 204). If not, the process ends. If so, the master agent 28 may optimize the client context of the recommendation client 32-1 for simulation (step 206). For example, if auto-generation of user preferences is enabled, the master agent 28 may modify the user preferences in the client context as a function of historical usage of the user 18-1, time of day, location, or the like. For example, based on the historical usage, the master agent 28 may determine how the user preferences are modified by the user 18-1 or otherwise altered over the course of a day. The master agent 28 may then optimize the user preferences in the client context to be used for simulation according to the current time of day and the manner in which the user preferences have historically been adjusted at the current time of day. More specifically, if the user 18-1 has historically played Rock music in the morning and Alternative music in the afternoon, the master agent 28 may determine the current time of day. If the current time of day is in the morning, the master agent 28 may modify the user preferences, if necessary, in order to identify the Rock music genre as a preferred music genre for the client context to be used for simulation.

In addition or alternatively, the master agent 28 may adjust or modify the client context to be used for simulation, and more specifically the user preferences to be used for simulation, to accommodate needs or preferences of friends or friends-of-friends of the user 18-1 who directly or indirectly receive recommendations from the user 18-1. More specifically, the master agent 28 may modify the user preferences used for simulation as a function of user preferences of downstream friends or friends-of-friends, types of content being played by downstream friends or friends-of-friends, explicit requests by downstream friends or friends-of-friends, or the like. For example, if the user preferences of the user 18-1 indicate that the user 18-1 prefers Country music but friends of the user 18-1 prefer or are currently interested in Jazz music, the user preferences of the user 18-1 may be modified during simulation. As a result, Jazz songs will be scored higher during simulation and recommendations for Jazz songs are more likely to be sent to the friends of the user 18-1.

At this point, the master agent 28 initiates the user agent 30-1 for simulating the recommendation client 32-1 (step 208). The user agent 30-1 then simulates the recommendation client 32-1 using the optimized client context. Note that optimization of the client context is optional. As such, the user agent 30-1 may alternatively simulate the recommendation client 32-1 using the most recent client context for the recommendation client 32-1. Once the user agent 30-1 is initiated, the master agent 28 registers the user agent 30-1 with the recommendation server 20 (step 210). The user agent 30-1 is registered with the recommendation server 20 such that recommendations to be forwarded to the recommendation client 32-1 are instead forwarded to the user agent 30-1.

Figure 5:
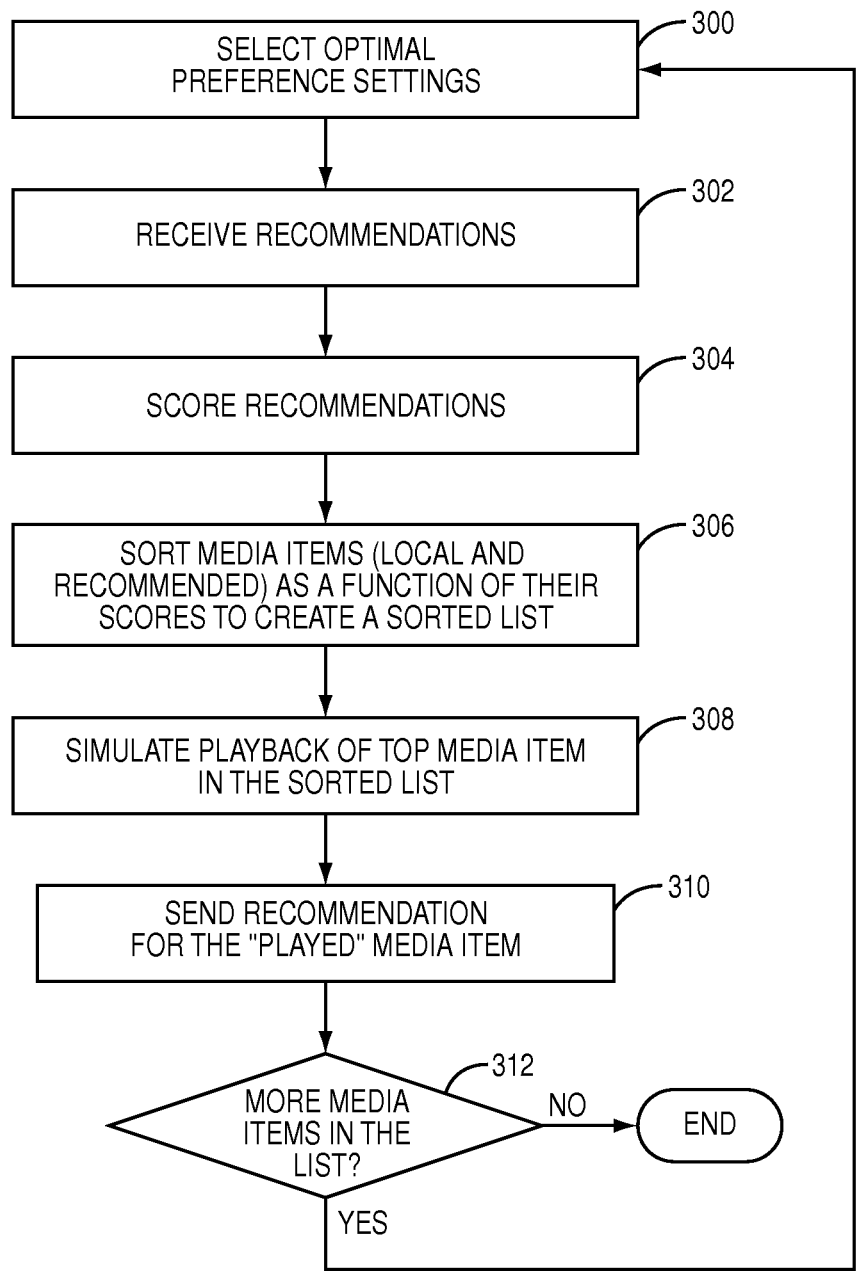
FIG. 5 is a flow chart illustrating the operation of a user agent initiated by the master agent of the recommendation simulator according to one embodiment of the present invention.

FIG. 5 is a flow chart illustrating the operation of the user agent 30-1 to simulate the recommendation client 32-1 according to one embodiment of the present invention. First, the user agent 30-1 selects optimal user preference settings (step 300). Note that this is also done by the master agent 28 in step 206 of FIG. 4. It is also performed by the user agent 30-1 in order to update the optimal user preferences. For example, updating the optimal user preferences used for simulation may be desired as the time of day changes, the needs or preferences of friends or friends-of-friends of the user 18-1 change, or the like.

In this example, the user agent 30-1 then receives recommendations from one or more of the recommendation clients 32-2 through 32-N associated with friends of the user 18-1 (step 302) and scores the recommended media items as a function of the optimal user preferences used for the simulation (step 304). Note that the scores of previously recommended media items and/or media items from the media collection 34-1 of the user 18-1 may be provided to the user agent 30-1 as part of the client context of the recommendation client 32-1.

The user agent 30-1 then sorts a list of media items, or provides a list of sorted media items, including the recommended media items, optionally one or more previously recommended media items, and optionally one or more media items from the media collection 34-1 of the user 18-1 as a function of their scores (step 306). Playback of the top media item, which is preferably the media item having the highest score, is then simulated by the user agent 30-1 (step 308). In response to the simulated playback of the media item, the user agent 30-1 sends a recommendation for that media item to the recommendation server 20 (step 310). The recommendation server 20 then forwards the recommendation to one or more of the recommendation clients 32-2 through 32-N associated with friends of the user 18-1. Note that if any of the recommendation clients 32-2 through 32-N are being simulated, recommendations to be provided to them are instead provided to the corresponding user agents 30-2 through 30-M. The user agent 30-1 then determines whether there are more media items in the sorted list (step 312). If not, the process ends. If so, the process returns to step 300 and is repeated.

Figure 6A:
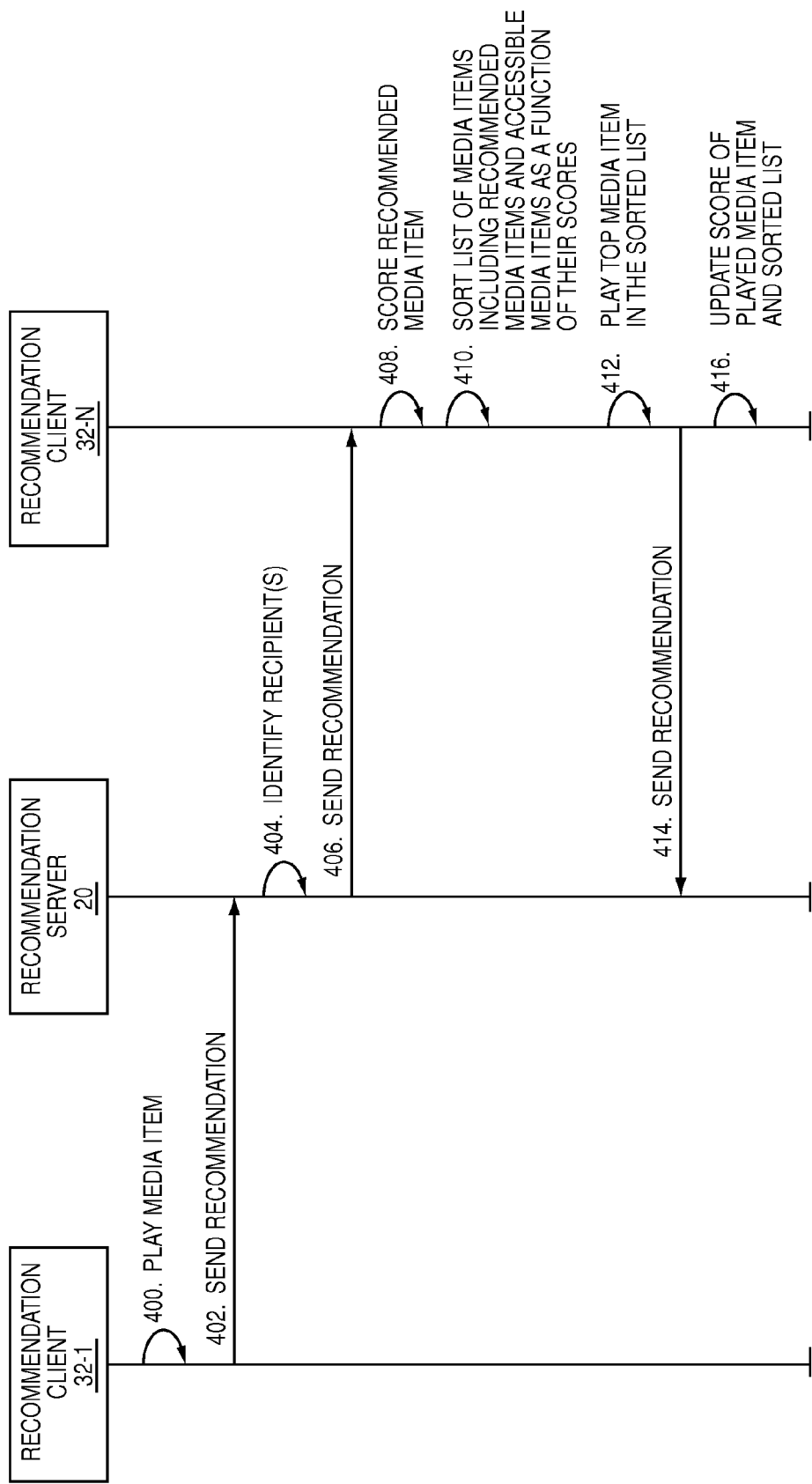
FIG. 6A illustrates the operation of the system of FIG. 1 when both the recommender and recipient of a recommendation are available according to one embodiment of the present invention.
Figure 6B:
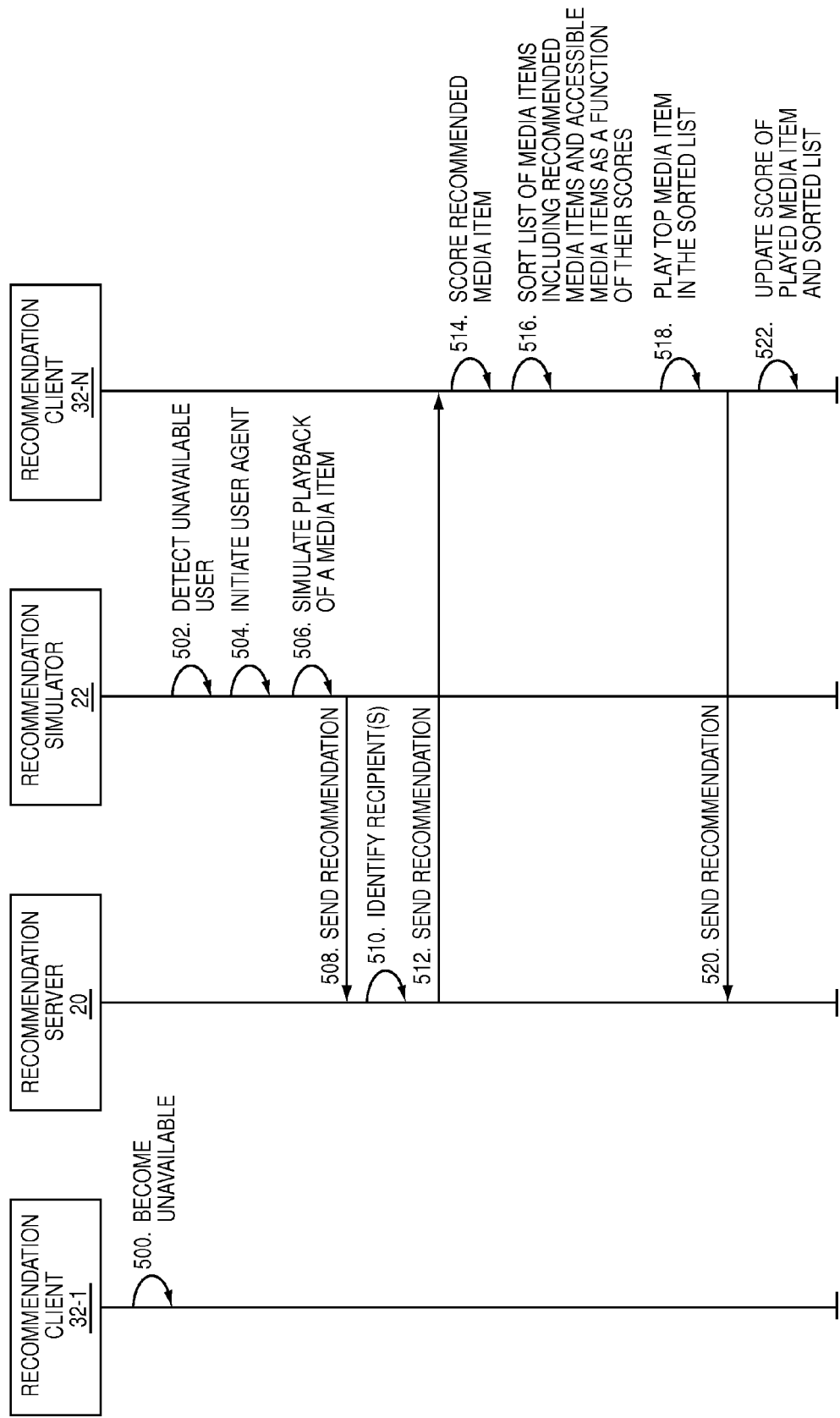
FIG. 6B illustrates the operation of the system of FIG. 1 where a user agent simulates the operation of a recommendation client of an unavailable user when sending a recommendation according to one embodiment of the present invention.
Figure 6C:
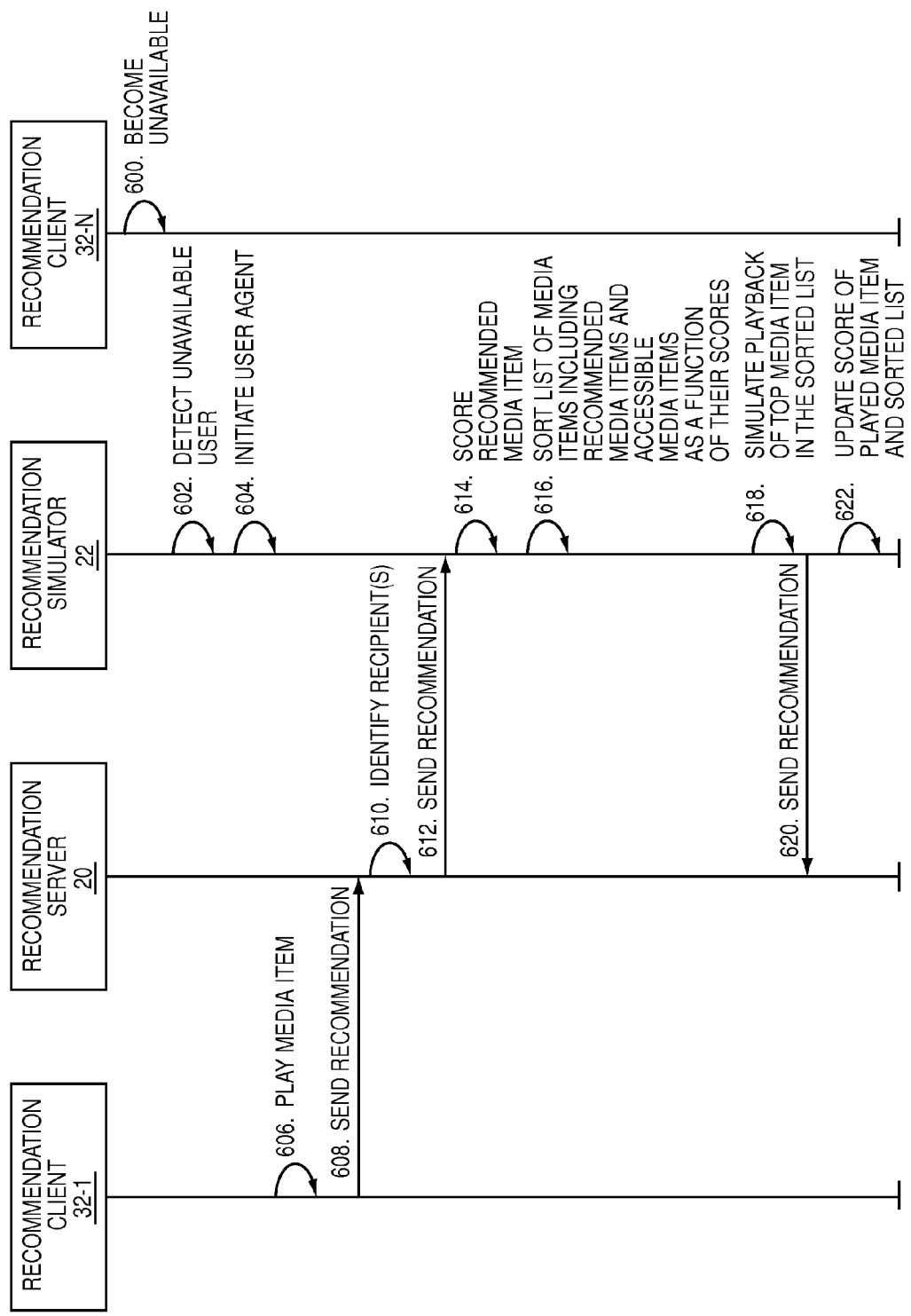
FIG. 6C illustrates the operation of the system of FIG. 1 where a user agent simulates the operation of a recommendation client of an unavailable user when receiving a recommendation according to one embodiment of the present invention.

FIGS. 6A through 6C illustrate the operation of the system 10 of FIG. 1 according to one embodiment of the present invention. FIG. 6A illustrates the operation of the system 10 when both the recommender and the recipient are available. As illustrated, the recommendation client 32-1 plays a media item (step 400). In response to playback of the media item, a recommendation for the media item is sent to the recommendation server 20 (step 402). The recommendation preferably includes a media identifier (ID) or other information identifying the recommended media item. However, the recommendation may additionally or alternatively include the media item itself, a preview of the media item, a reference to the media item, or the like. The recommendation may be sent when playback of the media item is initiated, during playback of the media item, or once playback of the media item is complete.

The recommendation server 20 identifies recipients for the recommendation (step 404). In one embodiment, the user profile of the user 18-1 associated with the recommendation client 32-1 includes a list of friends of the user 18-1, where the friends are one or more of the other users 18-2 through 18-N. As such, the recommendation server 20 may obtain the friends list of the user 18-1 and identify the friends of the user 18-1 as the recipients of the recommendation. In this example, the user 18-N associated with the recommendation client 32-N is a friend of the user 18-1. The recommendation server 20 then forwards the recommendation to the recommendation client 32-N associated with the friend of the user 18-1 (step 406). Note that in this example, the user 18-1 has only one friend. However, the user 18-1 may have any number of one or more friends.

In response to the recommendation, the recommendation client 32-N scores the recommended media item as a function of user preferences of the user 18-N (step 408). Note that recommendations previously received by the recommendation client 32-N and/or media items from the media collection 34-N of the user 18-N have already been scored. The recommendation client 32-N then sorts a list, or provides a sorted list, of media items including the recommended media items, optionally one or more previously recommended media items, and optionally one or more media items from the media collection 34-N of the user 18-N as a function of their scores (step 410). A top media item in the sorted list, which is preferably the media item having the highest score, is then played (step 412). In response to playback of the media item, a recommendation for the media item is sent to the recommendation server 20 (step 414). While not shown, the recommendation server 20 then forwards the recommendation to the recommendation clients, or alternatively user agents simulating the recommendation clients, of the friends of the user 18-N.

In this example, after playing the media item, the score for the media item is updated as a function of a no-repeat-factor, and the sorted list is updated (step 416). The no-repeat-factor may be, for example, a multiplier used to reduce the score of recently played media items in order to reduce or eliminate the possibility that a single media item is continually repeated because it always has the highest score. From this point, the process continues indefinitely.

FIG. 6B illustrates the operation of the system 10 of FIG. 1 where the recommending user, which in this example is the user 18-1, is unavailable. As shown, the recommendation client 32-1 first becomes unavailable (step 500). In response, the recommendation simulator 22 detects that the user 18-1 has become unavailable (step 502). In response, the recommendation simulator 22 initiates a user agent, which in this example is the user agent 30-1, to simulate the recommendation client 32-1 (step 504). As discussed above, the user agent 30-1 simulates the recommendation client 32-1 using a client context of the recommendation client 32-1 obtained from the recommendation client 32-1 prior to the user 18-1 becoming unavailable. The user agent 30-1 of the recommendation simulator 22 then simulates playback of a media item by the recommendation client 32-1 (step 506). More specifically, in one embodiment, a sorted list of media items is maintained, where the media items are sorted as a function of scores assigned to the media items. The top media item in the sorted list, which is preferably the media item having the highest score, is then selected for playback. The user agent 30-1 then simulates playback of the selected media item. The user agent 30-1 may simulate playback by waiting a period of time corresponding to a play length of the media item before selecting a next media item to play. Alternatively, the user agent 30-1 may actually play the media item using an associated media player. The media player may be external to the user agent 30-1 or embedded within the user agent 30-1.

In response to the simulated playback of the media item, the user agent 30-1 of the recommendation simulator 22 sends a recommendation for the media item to the recommendation server 20 (step 508). The recommendation server 20 then identifies recipients for the recommendation, which are preferably the friends of the user 18-1 (step 510). In this example, the user 18-N associated with the recommendation client 32-N is identified as a recipient, or friend, of the user 18-1. As such, the recommendation server 20 forwards the recommendation to the recommendation client 32-N (step 512). Note that the recommendation may be identified as a simulated recommendation. Further, the user preferences of the user 18-N may be defined such that simulated recommendations are assigned a different weight, and thus score, than non-simulated recommendations. For example, simulated recommendations may be assigned a lesser weight than non-simulated recommendations.

In response to receiving the recommendation, the recommendation client 32-N scores the recommended media item as a function of user preferences of the user 18-N (step 514). Note that recommendations previously received by the recommendation client 32-N and/or media items from the media collection 34-N of the user 18-N may have already been scored, if desired. The recommendation client 32-N then sorts a list, or provides a sorted list, of media items including the recommended media items, optionally one or more previously recommended media items, and optionally one or more media items from the media collection 34-N of the user 18-N as a function of their scores (step 516). If the sorted list is presented to the user 18-N, some type of visual indicator may be used to distinguish simulated recommendations from non-simulated recommendations.

A top media item in the sorted list, which is preferably the media item having the highest score, is then played (step 518). In response to playback of the media item, the recommendation client 32-N sends a recommendation for the media item to the recommendation server 20 (step 520). While not shown, the recommendation server 20 then forwards the recommendation to the recommendation clients, or alternatively user agents simulating the recommendation clients, of the friends of the user 18-N. In this example, after playing the media item, the score for the media item is updated as a function of a no-repeat-factor, and the sorted list is updated (step 522). The no-repeat-factor may be, for example, a multiplier used to reduce the score of recently played media items in order to reduce or eliminate the possibility that a single media item is continually repeated because it always has the highest score. From this point, the process continues indefinitely.

FIG. 6C illustrates the operation of the system 10 of FIG. 1 where the recipient, which in this example is the user 18-N, is unavailable. As shown, the recommendation client 32-N first becomes unavailable (step 600). In response, the recommendation simulator 22 detects that the user 18-N has become unavailable (step 602). In response, the recommendation simulator 22 initiates a user agent, which in this example is the user agent 30-N, to simulate the recommendation client 32-N (step 604). As discussed above, the user agent 30-N simulates the recommendation client 32-N using a client context of the recommendation client 32-N obtained from the recommendation client 32-N prior to the user 18-N becoming unavailable.

Some time thereafter, the recommendation client 32-1 plays a media item (step 606). In response to playback of the media item, the recommendation client 32-1 sends a recommendation for the media item to the recommendation server 20 (step 608). The recommendation server 20 identifies recipients for the recommendation (step 610). In this example, the user 18-1 associated with the recommendation client 32-1 is a friend of the user 18-N, and the user 18-N is therefore identified as a recipient for the recommendation. Since the recommendation client 32-N is being simulated by the recommendation simulator 22, the recommendation server 20 forwards the recommendation to the corresponding user agent 30-M of the recommendation simulator 22 rather than to the recommendation client 32-N (step 612). Note that in this example, the user 18-1 has only one friend. However, the user 18-1 may have any number of one or more friends.

In response to the recommendation, the user agent 30-M simulates the recommendation client 32-N by first scoring the recommended media item as a function of user preferences of the user 18-N (step 614). Note that recommendations previously received by the recommendation client 32-N and/or media items from the media collection 34-N of the user 18-N may have already been scored, if desired, where their scores are included in the client context provided to the recommendation simulator 22. The user agent 30-M continues to simulate the recommendation client 32-N by sorting a list, or otherwise providing a sorted list, of media items including the recommended media items, optionally one or more previously recommended media items, and optionally one or more media items from the media collection 34-N of the user 18-N as a function of their scores (step 616). The user agent 30-M then simulates playback of a top media item in the sorted list, which is preferably the media item having the highest score (step 618).

In response to the simulated playback of the media item, the user agent 30-M of the recommendation simulator 22 sends a recommendation for the played media item to the recommendation server 20 (step 620). While not shown, the recommendation server 20 then forwards the recommendation to the recommendation clients, or alternatively user agents simulating the recommendation clients, of the friends of the user 18-N. In this example, after simulating playback of the media item, the score for the media item is updated as a function of a no-repeat-factor, and the sorted list is updated (step 622). The no-repeat-factor may be, for example, a multiplier used to reduce the score of recently played media items in order to reduce or eliminate the possibility that a single media item is continually repeated because it always has the highest score. From this point, the process continues indefinitely.

Figure 7:
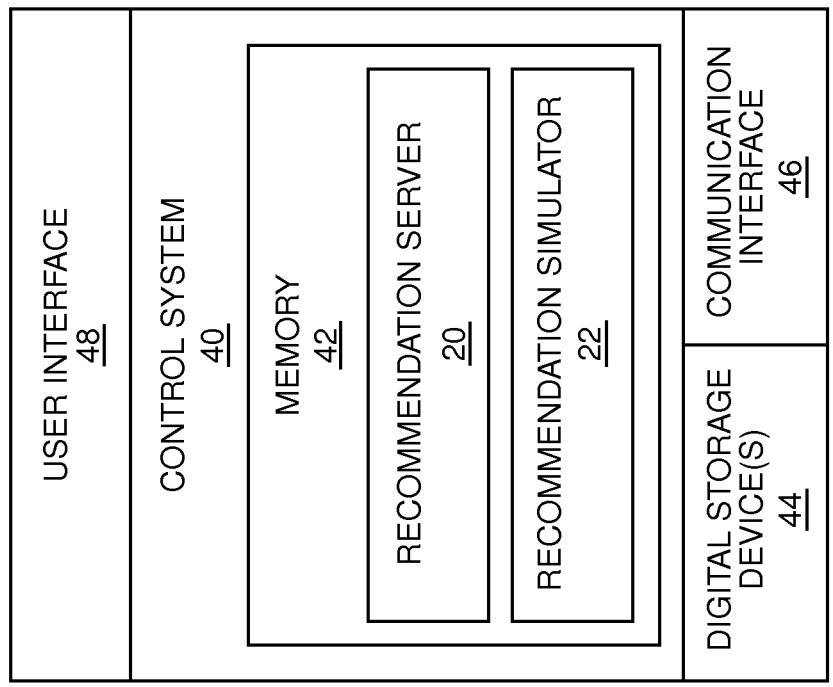
FIG. 7 is a block diagram of the central server of FIG. 1 according to one embodiment of the present invention.

FIG. 7 is a block diagram of an exemplary embodiment of the central server 12 of FIG. 1. In general, the central server 12 includes a control system 40 having associated memory 42. In this embodiment, the recommendation server 20 and the recommendation simulator 22 are implemented in software and stored in the memory 42. However, the present invention is not limited thereto. The central server 12 also includes one or more digital storage devices 44 such as, for example, one or more hard disk drives or the like. The user profiles 24 and the client context information 26 may be stored by the one or more digital storage devices 44. The central server 12 also includes a communication interface 46 communicatively coupling the central server 12 to the network 16 (FIG. 1). Lastly, the central server 12 includes a user interface 48, which may include components such as, for example, a display, one or more user input devices, and the like.

Figure 8:
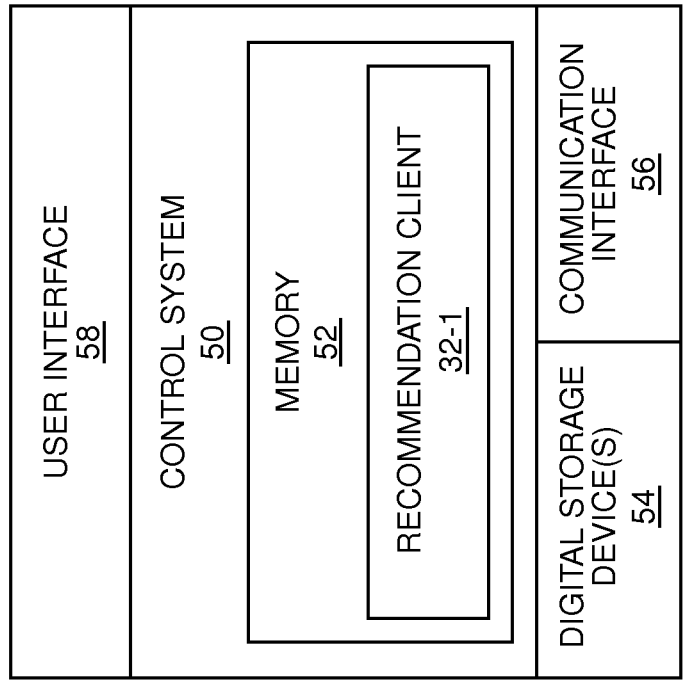
FIG. 8 is a block diagram of one of the user devices of FIG. 1 according to one embodiment of the present invention.

FIG. 8 is a block diagram of an exemplary embodiment of the user device 14-1 of FIG. 1. This discussion is equally applicable to the other user devices 14-2 through 14-N. In general, the user device 14-1 includes a control system 50 having associated memory 52. In this embodiment, the recommendation client 32-1 is implemented in software and stored in the memory 52. However, the present invention is not limited thereto. The user device 14-1 also includes one or more digital storage devices 54 such as, for example, one or more hard disk drives or the like. The media collection 34-1 (FIG. 1) may be stored by the one or more digital storage devices 54. The user device 14-1 also includes a communication interface 56 communicatively coupling the user device 14-1 to the network 16 (FIG. 1). Lastly, the user device 14-1 includes a user interface 58, which may include components such as, for example, a display, one or more user input devices, a speaker, and the like.

The present invention provides substantial opportunity for variation without departing from the spirit or scope of the present invention. For example, in the discussion above, the recommendation clients 32-1 through 32-N are implemented in the user devices 14-1 through 14-N. However, in an alternative embodiment, the recommendation clients 32-1 through 32-N may be completely or partially implemented on the central server 12 or some other central server. More specifically, in one embodiment, the recommendation clients 32-1 through 32-N are implemented on the central server 12 and operate essentially as discussed above. However, rather than playing media items at the user devices 14-1 through 14-N, the recommendation clients 32-1 through 32-N would stream the media items to the user devices 14-1 through 14-N. The users 18-1 through 18-N would be able to interact with the recommendation clients 32-1 through 32-N via a web browser, a custom application, or the like on the user devices 14-1 through 14-N. Further, since the recommendation clients 32-1 through 32-N would be implemented on the central server 12, the recommendation clients 32-1 through 32-N may perform their own simulation if desired. For example, when a user, such as the user 18-1, is unavailable, the recommendation client 32-1 may switch to a simulation mode. When the user 18-1 is again available, the recommendation client 32-1 would switch back to normal operation and either return to the point of operation where it was when the user 18-1 went offline or continue to operate from the point of operation where it was in simulation mode when the user 18-1 again became available.

As another example, while the discussion above focuses on the embodiment where the recommendation simulator 22 is implemented on the central server 12, the present invention is not limited thereto. In an alternative embodiment, the functionality of the recommendation simulator 22 may be distributed among the user devices 14-1 through 14-N. For example, when a user, such as the user 18-1, becomes unavailable, one of the other recommendation clients 32-2 through 32-N may simulate the recommendation engine 32-1 while the user 18-1 is unavailable. Note that, however, if the user 18-1 is unavailable but the user device 14-1 is still connected to or is capable of connecting to the network 16, the recommendation client 32-1 of the user 18-1 may switch to a simulation mode until the user 18-1 is again available. When the user 18-1 is again available, the recommendation client 32-1 may return to the point in operation where it was when the user 18-1 became unavailable or continue to operation from the point in operation where it was in simulation mode when the user 18-1 again became available.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   determining when a first user of a plurality of users forming a media recommendation network is unavailable; and
   because the first user is unavailable simulating to a second user of the plurality of users, via a computing device, recommendations from the first user while the first user is unavailable;
   wherein the plurality of users is associated with a plurality of recommendation clients, and simulating recommendations from the first user comprises simulating a recommendation client from the plurality of recommendation clients associated with the first user;
   wherein simulating the recommendation client associated with the first user comprises:
      selecting a media item from a plurality of media items to provide a selected media item;
      simulating playback of the selected media item; and
      sending a recommendation for the selected media item, the recommendation being provided to at least one recommendation client of the plurality of recommendation clients associated with at least one user of the plurality of users that is identified as a friend of the first user;
   wherein selecting the media item from the plurality of media items comprises:
      scoring each of the plurality of media items as a function of user preferences of the first user to provide a score for each of the plurality of media items; and
      selecting the media item from the plurality of media items as a function of the scores of the plurality of media items;
   wherein simulating the recommendation client further comprises optimizing the user preferences during simulation; and
   wherein optimizing the user preferences comprises modifying the user preferences as a function of user preferences of at least one user of the plurality of users that directly or indirectly receives recommendations from the recommendation client associated with the first user.

2. The method of claim 1 wherein simulating the recommendation client comprises:
obtaining a client context of the recommendation client, the client context being information needed in order to simulate the recommendation client; and
simulating the recommendation client using the client context.

3. The method of claim 1 wherein simulating the recommendation client comprises:
obtaining a client context of the recommendation client, the client context being information needed in order to simulate the recommendation client;
optimizing the client context to provide an optimized client context; and
simulating the recommendation client using the optimized client context.

4. The method of claim 3 wherein optimizing the client context comprises optimizing the client context as a function of historical information regarding operation of the recommendation client.

5. The method of claim 3 wherein optimizing the client context comprises optimizing the client context as a function of user preferences of at least one user of the plurality of users that directly or indirectly receives recommendations from the recommendation client associated with the first user.

6. The method of claim 3 wherein optimizing the client context comprises optimizing the client context as a function of media content currently being played by at least one user of the plurality of users that directly or indirectly receives recommendations from the recommendation client associated with the first user.

7. The method of claim 3 wherein optimizing the client context comprises optimizing the client context as a function of requests received from at least one user of the plurality of users that directly or indirectly receives recommendations from the recommendation client associated with the first user.

8. The method of claim 1 wherein optimizing the user preferences comprises optimizing the user preferences as a function of historical information regarding operation of the recommendation client of the first user.

9. The method of claim 1 wherein the user preferences are a user preference set from a plurality of user preference sets associated with the first user, and optimizing the user preferences comprises selecting one of the plurality of user preference sets to be used as the user preferences for simulation as a function of historical information regarding operation of the recommendation client of the first user.

10. The method of claim 1 wherein optimizing the user preferences comprises optimizing the user preferences as a function of media content currently being played by at least one user of the plurality of users that directly or indirectly receives recommendations from the recommendation client associated with the first user.

11. The method of claim 1 wherein optimizing the user preferences comprises modifying the user preferences as a function of requests received from at least one user of the plurality of users that directly or indirectly receives recommendations from the recommendation client associated with the first user.

12. The method of claim 1 wherein effecting sending of the recommendation comprises effecting sending of the recommendation at a time selected from the group consisting of: a time at which simulated playback of the selected media item begins, a time during simulated playback of the selected media item, and a time at which simulated playback of the selected media item completes.

13. The method of claim 1 wherein simulating the recommendation client associated with the first user comprises receiving at least one recommendation from the at least one recommendation client of the plurality of recommendation clients associated with the at least one user of the plurality of users that is identified as a friend of the first user.

14. The method of claim 13 wherein simulating the recommendation client associated with the first user further comprises:
selecting a media item from the plurality of media items to provide a selected media item, the plurality of media items comprising at least one media item identified by the at least one recommendation and a plurality of media items in a media collection of the first user;
simulating playback of the selected media item; and
sending a recommendation for the selected media item, the recommendation being provided to at least one recommendation client of the plurality of recommendation clients associated with at least one user of the plurality of users that is identified as a friend of the first user.

15. A system comprising:
a communication interface communicatively coupling the system to a plurality of user devices via a communication network, the plurality of user devices associated with a plurality of users forming a media recommendation network; and
a control system associated with the communication interface and adapted to:
determine when a first user of the plurality of users forming the media recommendation network is unavailable; and
because the first user is unavailable, simulate recommendations from the first user to a second user while the first user is unavailable.

16. The system of claim 15 wherein the plurality of users are associated with a plurality of recommendation clients, and in order to simulate recommendations from the first user, the control system is further adapted to simulate a recommendation client from the plurality of recommendation clients associated with the first user.

17. The system of claim 16 wherein in order to simulate the recommendation client, the control system is further adapted to:
obtain a client context of the recommendation client, the client context being information needed in order to simulate the recommendation client; and
simulate the recommendation client using the client context.

18. The system of claim 16 wherein in order to simulate the recommendation client, the control system is further adapted to:
obtain a client context of the recommendation client, the client context being information needed in order to simulate the recommendation client;
optimize the client context to provide an optimized client context; and
simulate the recommendation client using the optimized client context.

19. The system of claim 16 wherein in order to simulate the recommendation client associated with the first user, the control system is further adapted to:

select a media item from a plurality of media items to provide a selected media item;

simulate playback of the selected media item; and send a recommendation for the selected media item to at least one recommendation client of the plurality of recommendation clients associated with at least one user of the plurality of users that is identified as a friend of the first user.

20. The system of claim 16 wherein in order to simulate the recommendation client associated with the first user, the control system is further adapted to receive at least one recommendation from at least one recommendation client of the plurality of recommendation clients associated with at least one user of the plurality of users that is identified as a friend of the first user.

21. The method of claim 1 further comprising terminating simulated recommendations from the first user if the first user is available.

22. The system of claim 15 wherein the control system is further adapted to terminate simulated recommendations from the first user if the first user is available.

23. A method comprising:

determining when a first user of a plurality of users forming a media recommendation network is unavailable; and because the first user is unavailable simulating to a second user of the plurality of users, via a computing device, recommendations from the first user while the first user is unavailable;

wherein the plurality of users is associated with a plurality of recommendation clients, and simulating recommendations from the first user comprises simulating a recommendation client from the plurality of recommendation clients associated with the first user;

wherein simulating the recommendation client associated with the first user comprises:

selecting a media item from a plurality of media items to provide a selected media item;

simulating playback of the selected media item; and sending a recommendation for the selected media item, the recommendation being provided to at least one recommendation client of the plurality of recommendation clients associated with at least one user of the plurality of users that is identified as a friend of the first user;

wherein selecting the media item from the plurality of media items comprises:

scoring each of the plurality of media items as a function of user preferences of the first user to provide a score for each of the plurality of media items; and selecting the media item from the plurality of media items as a function of the scores of the plurality of media items;

wherein simulating the recommendation client further comprises optimizing the user preferences during simulation; and wherein optimizing the user preferences comprises modifying the user preferences as a function of requests received from at least one user of the plurality of users that directly or indirectly receives recommendations from the recommendation client associated with the first user.

* * * * *